(12) United States Patent
Ramanathan et al.

(10) Patent No.: US 8,179,843 B2
(45) Date of Patent: May 15, 2012

(54) DISTRIBUTED SCHEDULING METHOD FOR MULTI-ANTENNA WIRELESS SYSTEM

(75) Inventors: Parmeswaran Ramanathan, Madison, WI (US); Jayakrishnan C. Mundarath, Austin, TX (US); Barry Van Veen, McFarland, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 954 days.

(21) Appl. No.: 11/829,537

(22) Filed: Jul. 27, 2007

(65) Prior Publication Data

US 2009/0028099 A1 Jan. 29, 2009

(51) Int. Cl.
*H04W 4/00* (2009.01)
*H04L 12/28* (2006.01)
*H04J 4/00* (2006.01)

(52) U.S. Cl. .................. 370/329; 370/431; 455/435.1
(58) Field of Classification Search .................. None
See application file for complete search history.

(56) References Cited

U.S. PATENT DOCUMENTS

| | | | |
|---|---|---|---|
| 7,072,315 B1 * | 7/2006 | Liu et al. | 370/329 |
| 7,453,854 B2 * | 11/2008 | Fujishima et al. | 370/335 |
| 7,630,337 B2 * | 12/2009 | Zheng et al. | 370/329 |
| 2004/0202141 A1 * | 10/2004 | Sinivaara et al. | 370/338 |
| 2005/0037718 A1 * | 2/2005 | Kim et al. | 455/101 |
| 2006/0120395 A1 * | 6/2006 | Xing et al. | 370/431 |
| 2006/0233131 A1 * | 10/2006 | Gore et al. | 370/328 |
| 2007/0178839 A1 | 8/2007 | Rezvani et al. | |

OTHER PUBLICATIONS

Yoo, Taesang. et al., On the Optimality of Multiantenna Broadcast Scheduling Using ZeroForcing Beamforming, IEEE Journal on Selected Areas in Communications, Mar. 2006, pp. 528-541, vol. 24, No. 3, Washington, D.C., USA.
Eklund, Carl, et al., IEEE Standard 802.16: A Technical Overview of the WirelessMAN Air Interface for Broadband Wireless Access, IEEE Communications Magazine, Jun. 2002 pp. 98-107, Washington, D.C., USA.

* cited by examiner

*Primary Examiner* — Marcus R Smith
(74) *Attorney, Agent, or Firm* — Boyle Fredrickson, S.C.

(57) ABSTRACT

A channel allocation system for a beam-forming wireless network selects receivers to enroll in communication from a pool of candidate receivers, by off-loading a determination of the effects of adding each candidate receiver to the candidate receiver itself. In one embodiment, the candidate receivers nominate themselves for enrollment based on their determination of aggregate data rate changes resulting from their enrollment and the comparison of this aggregate data rate change against an estimate of the aggregate data rate changes of other candidate receivers.

22 Claims, 4 Drawing Sheets

DISTRIBUTED SCHEDULING METHOD FOR MULTI-ANTENNA WIRELESS SYSTEM

STATEMENT REGARDING FEDERALLY SPONSORED RESEARCH OR DEVELOPMENT

This invention was made with United States government support awarded by the following agency: NSF 0519824. The United States has certain rights in this invention.

CROSS-REFERENCE TO RELATED APPLICATIONS

--

BACKGROUND OF THE INVENTION

The present invention relates to wireless communication systems having multi-antenna base stations, and, in particular, to a scheduling method for such wireless communication systems allowing improved multiple input multiple output (MIMO) operation.

Multiple antenna wireless systems can increase the number of separate communication channels that can be provided between a given transmitter and receiver. Multiple antennas on either of a transmitter or receiver allow creation of channels that are spatially selective using a process termed "beam forming." In multi-user beam forming, a beam-forming vector $w_i$ is created for each user i up to a maximum number of users or channels equal to the number of antennas on the transmitter. Each vector $w_i$ provides a phase and amplitude (expressed as a complex number) for transmission over each antenna element selected to allow simultaneous communication over different channels with a signal to interference and noise ratio (SINR) at each receiver above a specified threshold. This type of multi-user communication is commonly referred to as space division multiple access (SDMA).

Choosing the optimal beam forming vectors $w_i$ requires solving a difficult non-convex optimization problem. Accordingly, a simpler form of multi-user beam forming employs zero forcing beam forming (ZFBF) in which the channels $w_i$ are selected to provide zero interference with each other.

Space division multiple access may be used with other multiplexing techniques, such as time division multiplexing and frequency division multiplexing including frequency hopping or spread spectrum techniques that can allow multiple users to be served by each ZFBF channels.

At any given time, a ZFBF base station transceiver with a given number of logical channels may need to serve a pool of users greater than the number of channels. It is desirable in such circumstances to maximize the aggregate data rate of all channels by proper selection of which users to serve or "enroll" in communication. For example, one may want to maximize the aggregate data rate to provide efficient use of the transmitting equipment and on average, allow the transmitting equipment to accommodate a larger number of typical users. Other channel allocation strategies looking at fairness, quality of service, or the like, may also be used.

While determining the vectors $w_i$ for a given set of users i using ZFBF is relatively simple, determining the optimal user subset i from a pool of M can quickly become mathematically intractable. Such a search involves a space of size equation $$\sum_{i=1}^{Nt} \binom{M}{i}$$

where $$\binom{M}{i} = \frac{M!}{i!(M-i)!}$$

Optimizations requiring an exhaustive search with a pool size as small as twelve in the time frames required by modern communication systems are currently impossible.

In addition to the mathematical complexity of the optimization process, the optimization requires a communication overhead, that is, additional data that must be communicated between the base station and mobile stations outside the data communicated by the users of the two nodes, for example, voice data in a phone system.

Referring now to FIG. 1, a base station 10 with, for example, four antennas 12a-12d may communicate with a pool of six mobile stations 14a-14f. In the optimization problem, a test signal 16a-16d must be sent from each antenna 12a-12d to single antennas (in this example) on mobile stations 14a-14f.

The test signals 16a-16d characterize the quality of a channel between each antenna 12a-12d of the base station 10 and each individual mobile station 14. This information is collected in logical channel-characterizing vector tables 18a-18f, one for each of the mobile stations 14a-14f. In this example, each of the six channel-characterizing vector tables 18 includes four channel characterizing vectors 20, one for each of the test signals 16a-16d and thus one for each of the antennas 12a-12d. All of this data must be transmitted from the mobile stations 14a-14f to the base station 10 so that the base station 10 can identify the optimum subset of users. As the pool of users grows, this transmission overhead, to the extent that it subtracts from the aggregate data rate or other metric, can overwhelm the benefits obtainable from the optimization process.

The problem of complexity in selecting an optimum subset of users i from a pool M for beam forming transmissions may be handled, to some extent, by mathematical approximations which reduce the search space at the cost of possibly arriving at a sub-optimal solution. Such mathematical approximations do not solve the problems of data overhead for large pool sizes M.

SUMMARY OF THE INVENTION

The present invention provides a method of scheduling users in an MIMO system that addresses these two problems of mathematical intractability and communication overhead by offloading the optimization process to the individual receivers. This provides two benefits. First, as the number of users increases, the potential computational power also increases, improving the scalability of the optimization process. Second, by distributing the optimization process, the amount of data that must be communicated to a centralized source, the data overhead for optimization processes, is significantly reduced.

In a preferred embodiment, zero-forcing beam-forming is employed to simplify the channel vector calculations so that they can be easily handled by the computational power of current mobile receivers.

The invention also addresses the scheduling problem incrementally by only scheduling open channels and assuming a starting condition of the channels of currently enrolled mobile receivers. This comports with a general desire not to interrupt ongoing communications and greatly simplifies the search space for the optimization.

Specifically then, the present invention provides a method of dynamically allocating communication channels between a base station and a group of mobile stations. The method includes the steps of providing a candidate mobile station with a test signal allowing the candidate mobile station to characterize a new channel between the base station and the candidate mobile station. At the candidate mobile station, information is collected characterizing existing channels in use between the base station and currently enrolled mobile stations. The candidate mobile station calculates an aggregate quality of communication if the candidate mobile station were enrolled and this aggregate quality is used to determine whether the candidate mobile station will be enrolled or not. "Aggregate quality" in this context is intended to mean a determination of the expected quality of the communication in light of the currently enrolled mobile stations and should not be read to be limited to, for example, the total data rate of all enrolled mobile stations but could in fact be an incremental data rate of a single mobile station when that mobile station is added to other currently enrolled mobile stations.

It is thus a feature of at least one embodiment of the invention to allow the mobile stations to undertake their own assessment of whether they are part of an optimal solution, thus relieving the burden of this calculation from a central base station.

The information characterizing existing channels may be transmitted from the base station to the candidate mobile station.

Thus, it is a feature of at least one embodiment of the invention to allow the base station to serve as a repository for the necessary optimization information without requiring it to perform the optimization process.

The determination step may include the step of transmitting aggregate quality to the base station for comparison against similar aggregate quality values transmitted from other candidate stations.

Thus, it is a feature of at least one embodiment of the invention to employ the central location of the transmitter to make a final determination of whether each candidate station may be enrolled or not while still eliminating the need for optimization calculations by the base station.

The aggregate quality may be compressed to allow multiple candidate receivers to transmit aggregate quality in a single time frame.

Thus, it is a feature of at least one embodiment of the invention to allow this off loading process to be accomplished with reduced cost in terms of transmission overhead.

The candidate stations may transmit information characterizing the new channel to the base station when they are enrolled.

Thus, it is a feature of at least one embodiment of the invention to update the base station with channel information only to the extent necessary.

Alternatively, the step of evaluating the aggregate quality may be performed at the candidate station, which may then transmit a request for enrollment only if the aggregate quality is above a predetermined threshold.

Thus, it is a feature of at least one embodiment of the invention to eliminate the need to transfer significant amounts of aggregate quality information to the base station by allowing self-assessment to be performed at the candidate mobile station.

The request for enrollment may be the transmission of information characterizing the new channel.

Thus, it is a feature of at least one embodiment of the invention to allow the request for enrollment to do double duty both as a request and as a method of updating the base station with current channel information.

The information characterizing the channels may be the attenuations and phase shifts of the transmitted signal between each transmit antenna at the base station and each receive antenna at the candidate-mobile station.

Thus, it is a feature of at least one embodiment of the invention to provide a system that works well with spatial multiplexing systems.

These particular features and advantages may apply to only some embodiments falling within the claims and thus do not define the scope of the invention.

DETAILED DESCRIPTION OF THE PREFERRED EMBODIMENT

Figure 1:
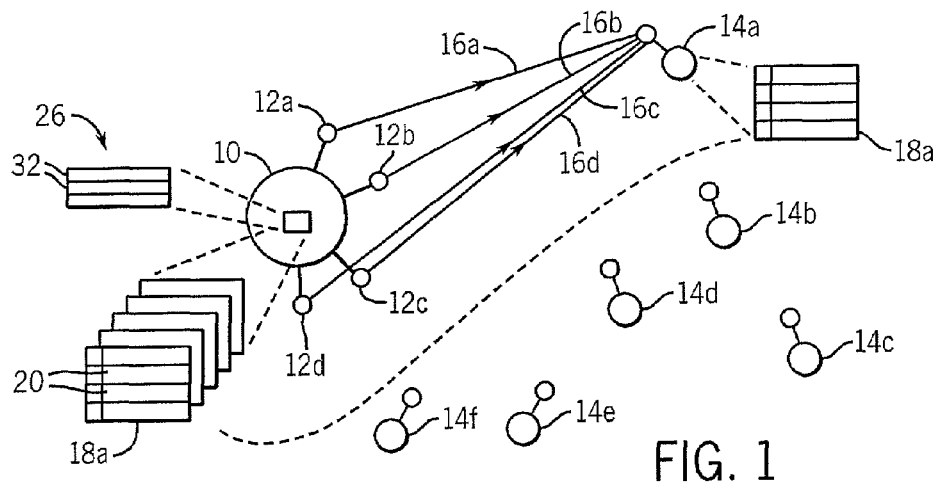
FIG. 1 is a schematic representation of a MIMO system of the prior art showing the collection of channel characterizing information at the central transmitter.
Figure 2:
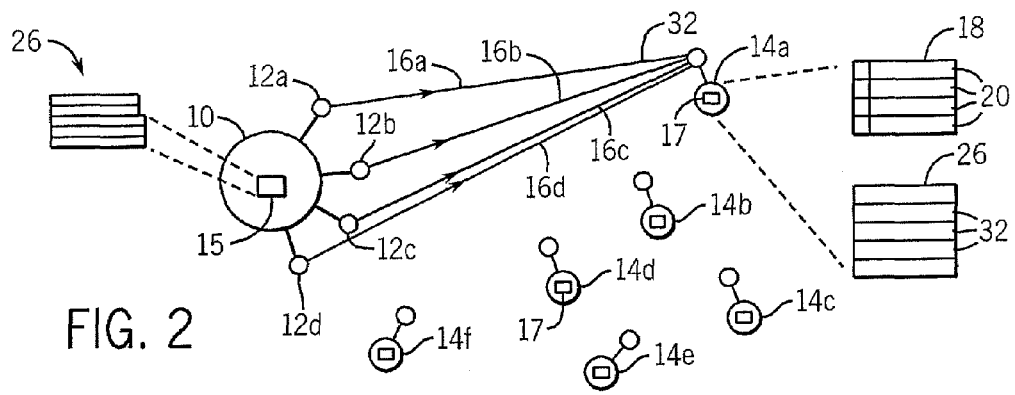
FIG. 2 is a figure similar to that of FIG. 1, showing a retention of this channel characterizing information by a candidate mobile receiver which also receives beam forming vectors from currently enrolled receivers, used by the candidate mobile receiver to assess the value of its enrollment.

Referring now to FIG. 2, the present invention may employ a base station 10, for example, being a radio transceiver being part of a cellular telephone system or wireless local area system. The base station 10 may have multiple antennas 12a-12c that may communicate with a pool of mobile stations 14a-14f, being radio transceivers compatible with the base station 10.

Each of the base station 10 and mobile stations 14 may employ radio-frequency communication hardware, for example, suitable for time division multiplexing, frequency division multiplexing, and frequency hopping according to techniques well known in the art. The base station 10 incorporates a program 15 and the mobile stations 14a-14f incorporate programs 17 controlling their operation per the present invention as will now be described.

Figure 4:
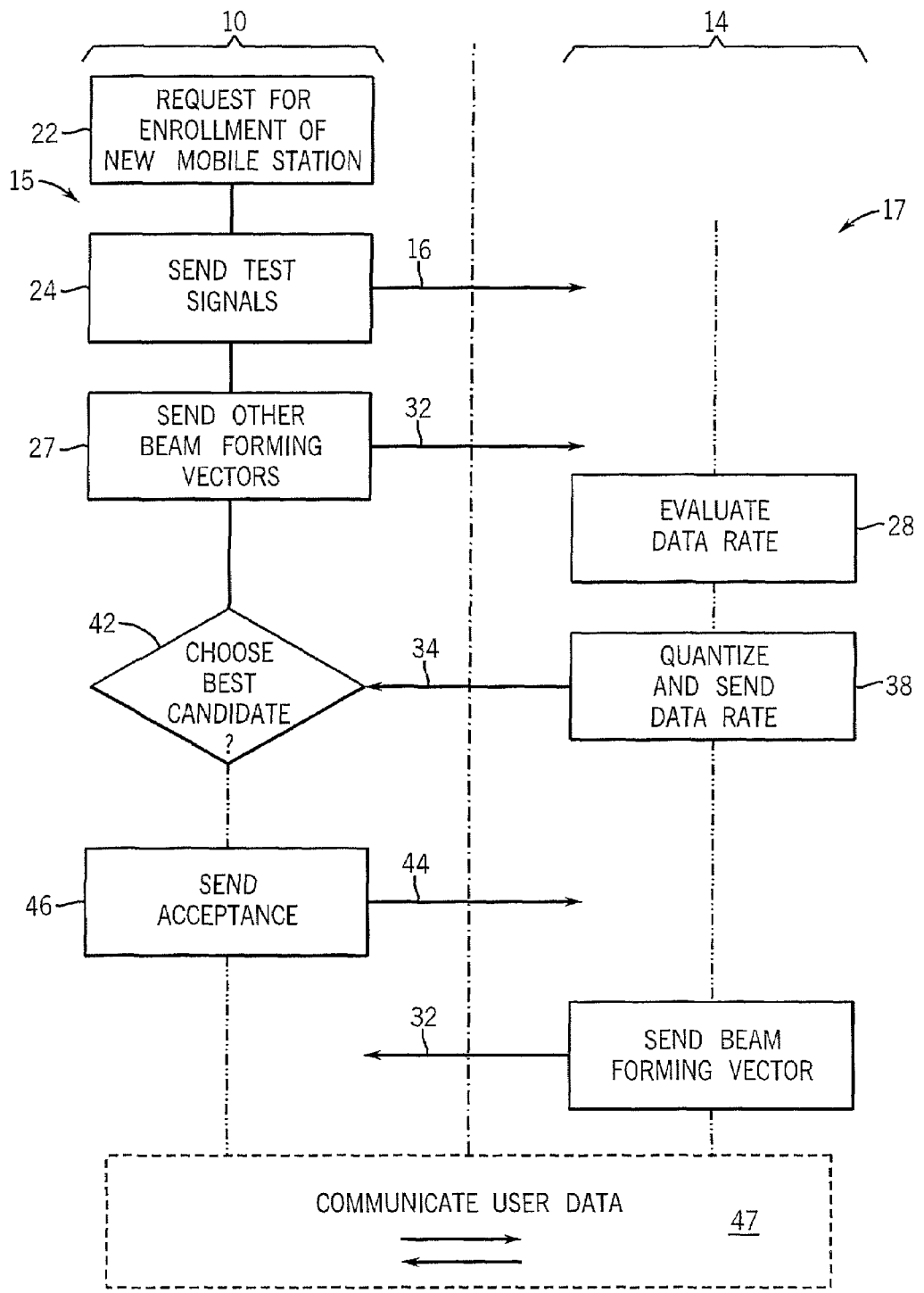
FIG. 4 is a flow chart showing the operation of programs in the base station and the mobile station implementing the first embodiment of the invention.

Referring now to FIGS. 2 and 4, at any given time, the base station 10 may receive data from a network intended for a new mobile station 14a, per process block 22, and effectively representing an enrollment request that mobile station 14a be enrolled into communication with the base station 10. At the time of this request, there will normally be a pool of other mobile stations 14b, 14c, 14d and 14e that are currently enrolled and communicating user data with the base station 10 and there may be at least one other mobile station 14f that may also be the subject of an enrollment request (as the result of other network data received by the base station 10).

Upon receiving this enrollment request, the base station 10 may send test signals 16 as described above and as indicated by process block 24 to the mobile stations 14a and 14f (the latter not shown for clarity) allowing the mobile stations 14a and 14f to characterize their communication channels from each of the antennas 12a-12c. From this data, the mobile stations 14a (and 14f) create channel-characterizing vector tables 18 having vectors 20 characterizing the phase and amplitude of each of the test signals 16.

The base station 10 also sends beam forming vectors 32, per process block 27, for each of the currently enrolled mobile stations 14b-14e, which are collected at the mobile stations 14a and 14f in a current beam-forming vector table 26 holding one beam forming vector 32 for each enrolled mobile station 14. The beam forming vectors 32 are the values $w_i$ currently used by the base station 10 for the currently enrolled mobile stations 14b-14e as calculated using spatial user separation schemes, including but not limited to ZFBF techniques known in the art, or regularized ZFBF, the later as described in C. Peel, B. Hochwald, A. Swindlehurst, "Vector-perturbation technique for near-capacity multiantenna multiuser communication-Part I: channel inversion and regularization," IEEE Transactions on Communications, vol 53, pp 195-202, 2005. The beam forming vectors 32 may be incorporated into the test signals 16a-16d or transmitted separately. The data of the beam forming vectors 32 is relatively compact as it is limited to a single vector for only enrolled receivers and is not, for example, the characterizations of the channels between antennas 12a-12c and every one of the enrolled mobile stations 14b-14e.

Figure 3:
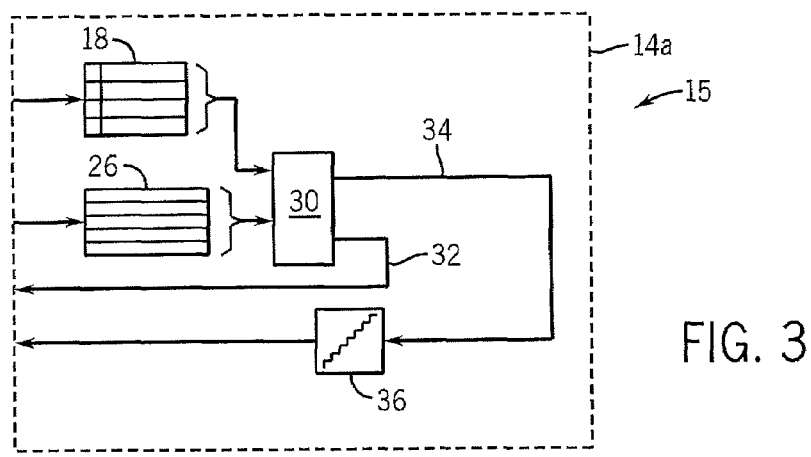
FIG. 3 is a data flow diagram of computations performed by the candidate station in a first embodiment of the invention where the candidate station returns an aggregate quality value to the base station for the latter to select whether the candidate station will be enrolled.

Referring to FIGS. 3 and 4, at process block 28, the candidate mobile station 14a uses the current beam-forming vector table 26 and the channel-characterizing vector tables 18 to evaluate a new beam forming vector 32 for the mobile station 14a that would cause zero or low interference with the currently enrolled mobile stations 14b-14e, if the mobile station 14a were to be enrolled with the currently enrolled mobile stations 14b-14e to exchange user data with the base station 10. The candidate mobile station 14a also calculates a network performance metric 34 (such as aggregate data rate value, fairness, quality of service, etc.) if the mobile station 14a were to be enrolled using the new beam forming vector 32. When the network performance metric 34 is aggregate data rate value, for example, it represents is the combined maximum data rate possible with all of mobile stations 14a-14e enrolled.

Referring to FIG. 3, the current beam-forming vector table 26 and the channel-characterizing vector tables 18 are received by an optimizer 30 of a type known in the art for use in base stations 10 that output a new beam forming vector 32 and the network performance metric 34. This network performance metric 34 is then quantized as indicated by compression block 36 which serves the effect of significantly compressing the amount of data that needs to be transmitted to the base station 10.

At process block 38, the compressed network performance metric 34 is sent to the base station 10 which receives similar data from all other contending candidate receivers, for example, mobile station 14f.

At process block 42, the base station 10 simply compares the network performance metric 34 from each contending mobile station 14a and 14f and selects that mobile station 14a which will provide the best network performance and respond with that decision per process block 46 with an enrollment acknowledgement signal 44 to selected mobile station 14a.

At which time the mobile station 14a sends its beam forming vector 32 and/or channel information to the base station 10, per process block 40, and enters an enrollment state 47 where user data is communicated.

If a mobile station (e.g., 14f) is not selected, its enrollment request may be repeated at a later period in time per process block 22.

Figure 5:
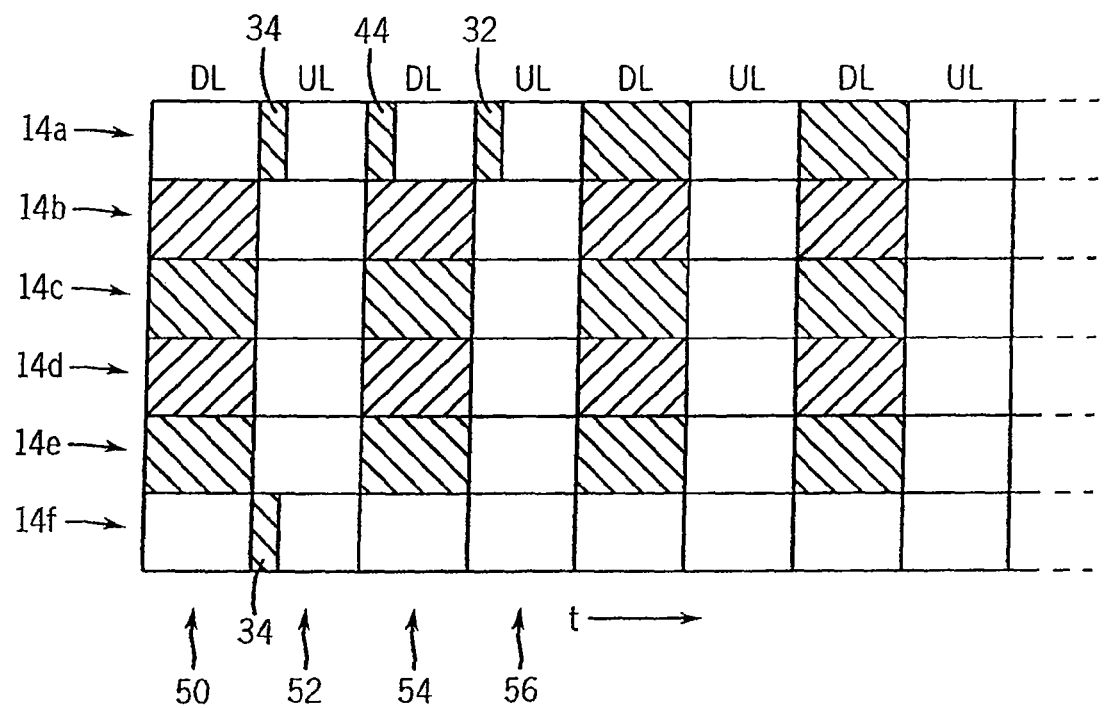
FIG. 5 is a plot of data transmission as a function of time for multiple channels showing quantization of the aggregate quality information such as allows multiple candidate stations to simultaneously be assessed.

Referring now to FIG. 5, in a normal time division multiplexing system in which the communication channels between the base station 10 and each of the mobile stations 14a-14f are divided into downlink (base station to mobile station transmissions) designated "DL" and uplink (mobile station to base station transmissions) designated "UL" sections, the present invention will efficiently allow a new candidate mobile station 14a to be enrolled within two downlink time frames. After a first download time slice 50 each of the candidate mobile stations 14a and 14b may use the upload time slice 52 to upload their quantized network performance metric 34. The quantization allows simultaneous transmission of these multiple network performance metrics 34 from multiple candidate mobile stations 14.

During the next download time slice 54, the base station 10 may select a particular candidate, in this case, mobile station 14a and provide enrollment acknowledgement signal 44 to that candidate mobile station 14a and during succeeding download time slice 54. At the next upload time slice 56, the candidate may upload its beam forming vector 32 and thus be enrolled for subsequent time slices until it elects to drop out of the system.

This embodiment as described both reduces the calculation burden on the base station 10 of selecting among mobile stations 14 and reduces the amount of data that needs to be transmitted from the mobile stations 14 to the base station 10 as part of the selection process. When the base station 10 is first initialized, the process may be simplified so that the entire community of mobile stations 14b-14d is treated as a candidate receiver and simply computes its network performance metric 34 assuming it is the only enrolled mobile station 14 and this is used to select an initial group of mobile stations 14 to enroll. This initialization occurs relatively infrequently and thus optimization is not required and a large number of other schemes could be envisioned.

Figure 6:
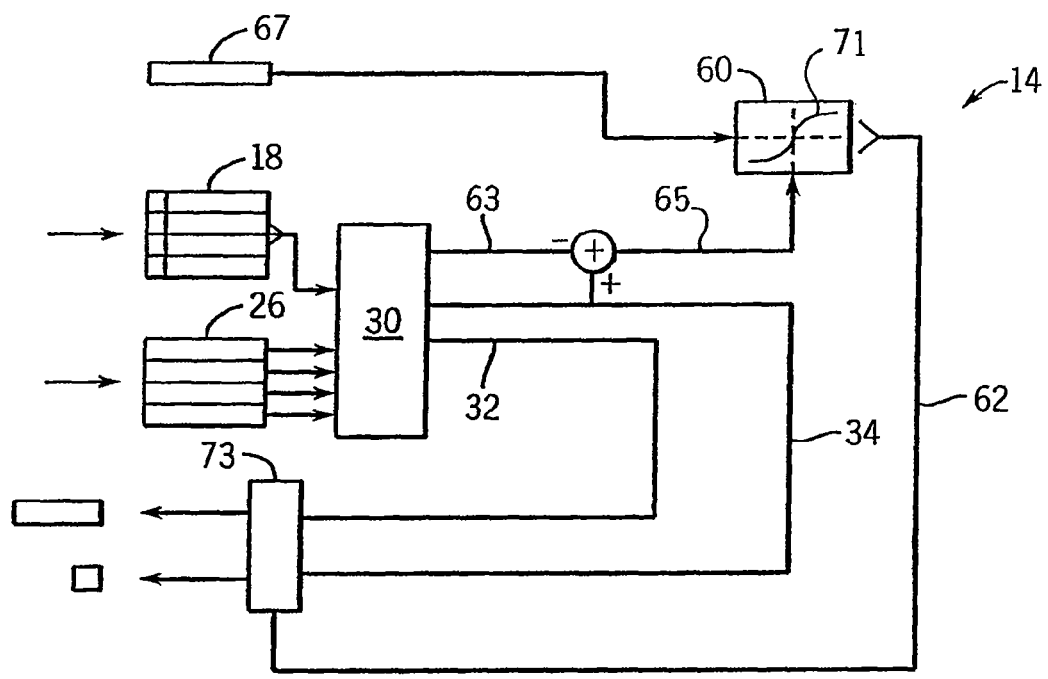
FIG. 6 is a figure similar to that of FIG. 3 showing an alternative embodiment where the candidate stations perform a self-assessment reducing the transmission of data between the candidate stations and the base station.
Figure 7:
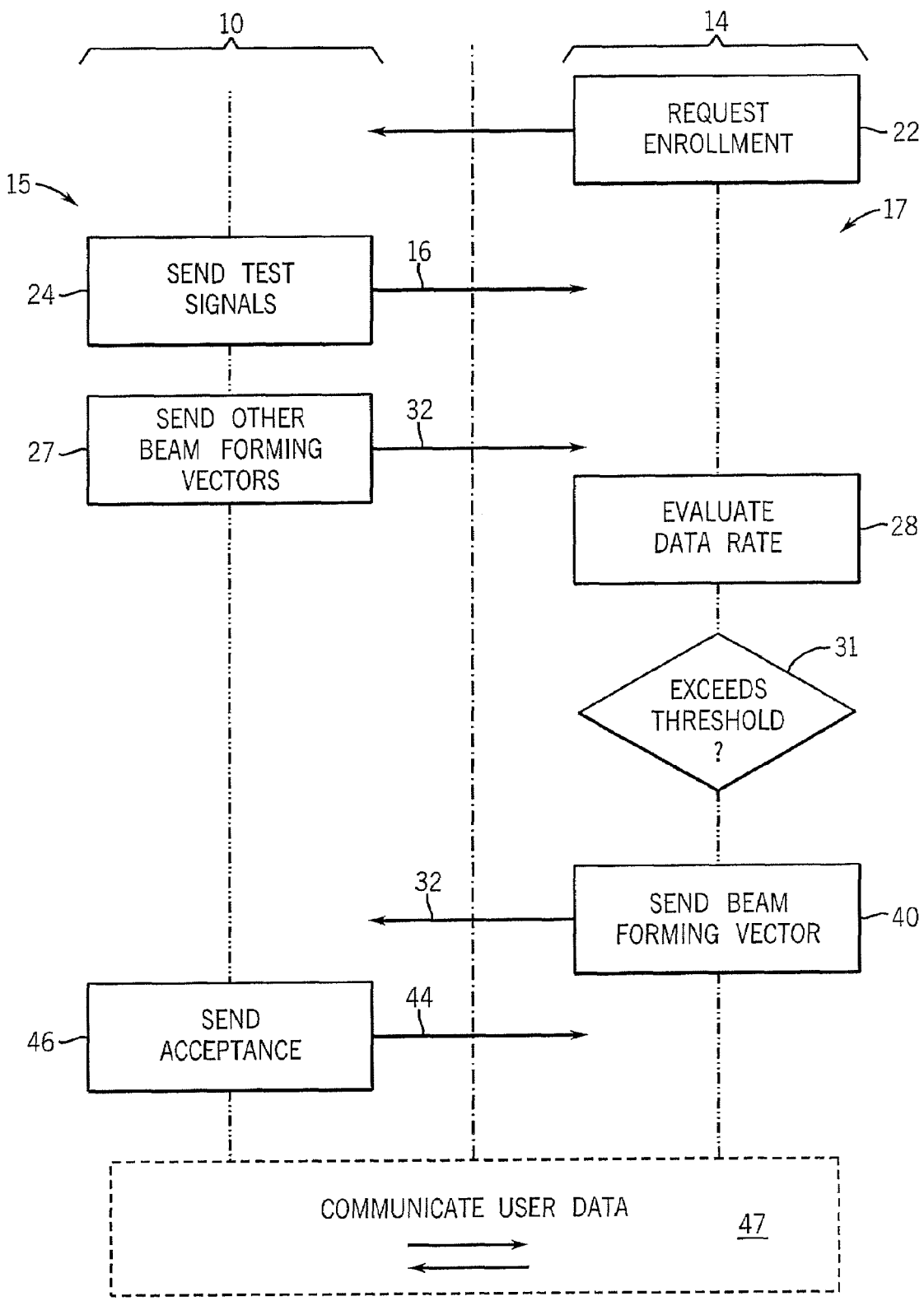
FIG. 7 is a flow chart similar to FIG. 4 of the embodiment of FIG. 6.

Referring now to FIGS. 6 and 7, in an alternative embodiment, the data overhead and possible contention in the transmission by multiple candidate mobile stations 14a and 14f of their network performance metric 34 may be avoided by delegating the actual decision to enroll or not, at least in part, by the individual candidate mobile stations 14a and 14f. In this way, network performance metric 34 need not be communicated and the selection process need not be made by the base station 10

In this embodiment, as shown in FIG. 6, the channel-characterizing vector table 18 and a current beam-forming vector table 26 are again collected and provided to the optimizer 30, which produces an network performance metric 34 and a beam forming vector 32 for the optimal introduction of the particular mobile station 14a. This data, as before, is collected by a series of blocks 22, 24, and 27 as described above. In contrast to the previous embodiment, however, in this embodiment, the network performance metric 34 is provided to a threshold detector 60, which assesses whether it is likely that the base station 10, if it knew all of the network performance metrics 34 for different candidate mobile stations 14a and 14f, would select the particular mobile station 14a. This self-assessment is shown in FIG. 7 as process block 31.

In a simplest embodiment, the threshold detector 60 may simply evaluate the improvement in network performance metric 34 (delta value 65) that occurs of the preexisting network performance metric 63 with the addition of the mobile station 14a over what existed previously to produce a nomination signal 62. The delta value 65 may be evaluated against a fixed threshold to yield a decision of whether the mobile station 14a will self-nominate for enrollment. A threshold 67 may be provided by the base station 10 based on the experience of the base station 10 with the number of candidate mobile stations 14 requesting enrollment and an evaluation of the delta values for those accepted candidates. In this way, the threshold 67 may be adjusted to reduce the amount of overhead traffic, yet ensure that viable candidates self-nominate.

Alternatively, this delta value 65 may used to produce a weighted random number (shown as a curved nomination function 71) that determines whether self-nomination is performed, for example, with the likelihood of self-nomination increasing as the delta value increases.

If the result of the threshold process is to self-nominate, the program proceeds to process block 40 in which it sends its beam forming vector 32 (through gate 73) that serves both to indicate a desired self-nomination and to provide the beam forming vector 32 and/or the channel information.

At process block 42, the base station 10 may select among several possible self-nominations, arbitrarily, indicating that enrollment has been accepted. No additional transmissions of data from the mobile station 14 are required in this case.

It is specifically intended that the present invention not be limited to the embodiments and illustrations contained herein. For example, other measures of a candidate receiver's fitness for enrollment other than aggregate data rate value can be used. For this reason, the invention may include modified forms of those embodiments including portions of the embodiments and combinations of elements of different embodiments as come within the scope of the following claims.

We claim:

1. A method of dynamically allocating communication channels of a network between a base station and a group of mobile stations, the method comprising the steps of:
   (a) providing a candidate mobile station not yet enrolled in the network with a test signal allowing the candidate mobile station to characterize a new channel between the base station and the candidate mobile station as a channel characterizing vector table characterizing the phase and amplitude of the test signal of multiple antennas;
   (b) transmitting to the candidate mobile station information characterizing existing channels in use between the base station and enrolled mobile stations by providing information for a channel-characterizing vector table for the enrolled mobile stations, the channel characterizing vector table having information about phase and amplitude for multiple antennas currently used for communication between the base station and the enrolled mobile stations;
   (c) calculating at the candidate mobile station, by using the collected channel characterizing vector tables for the enrolled and candidate mobile stations a network performance metric of communication indicating an aggregate quality of the network communication among the base station and multiple other enrolled mobile stations and the candidate station as if the candidate mobile station were enrolled, the aggregate quality being based at least in part on the information characterizing existing channels in use between the base station and the multiple other enrolled mobile stations; and
   (d) determining at either the base station or the candidate mobile station whether the candidate mobile station can join in the network using the new channel based on the network performance metric calculated by the candidate mobile station based at least one of a determination that the aggregate quality is above a predetermined threshold or the aggregate quality is above the aggregate quality of other candidate mobile stations.

2. The method of claim 1 wherein information characterizing existing channels is transmitted from the base station to the candidate mobile station.

3. The method of claim 1 wherein the determining of step (d) includes the step of transmitting the network performance metric to the base station for comparison against similar network performance metrics transmitted from other candidate mobile stations.

4. The method of claim 2 wherein the network performance metric is compressed to allow multiple candidate receivers to transmit network performance metrics in a single time frame.

5. The method of claim 2 including the step of transmitting information characterizing the new channel to the base station when the candidate mobile station is enrolled.

6. The method of claim 1 wherein the determining of step (d) includes the step of evaluating the network performance metric at the candidate mobile station and transmitting a self-nomination to join the network using the new channel only if the network performance metric is above a predetermined threshold.

7. The method of claim 6 wherein self-nomination is a transmission of information characterizing the new channel.

8. The method of claim 1 wherein the information characterizing the channels is the attenuations and phase shifts of a transmitted signal between each transmit antenna at the base station and each receive antenna at the candidate mobile station.

9. The method of claim 1 wherein the base station provides multiple transmitting antennas and wherein the test signal is a signal from each of the antennas.

10. The method of claim 1 wherein the communication channels are selected from the group consisting of zero-forcing beam forming channels and regularized zero-forcing beam forming channels.

11. The method claim 1 wherein the calculating at the candidate mobile station of the network performance metric assumes existing channels in use between the base station and enrolled mobile stations are unchanged.

12. A communication system comprising:
   at least one base station;
   a set of mobile stations including enrolled stations communicating with the base station as part of a network, and candidate stations not enrolled with the network but seeking to enroll with the network and communicate with the base station;
   wherein the base station executes a stored program to transmit a test signal to at least one candidate mobile station to allow the candidate mobile station to characterize a new channel between the base station and the candidate mobile station as a channel characterizing vector table characterizing the phase and amplitude of the test signal of multiple antennas; and
   wherein the candidate mobile station executes a stored program to:

(a) receive from at least one of the base station and enrolled mobile stations information characterizing existing channels in use between the base station and enrolled mobile stations by providing information for a channel-characterizing vector table for the enrolled mobile stations, the channel characterizing vector table having information about phase and amplitude for multiple antennas currently used for communication between the base station and the enrolled mobile stations;

(b) calculate at the candidate mobile station by using the collected channel characterizing vector tables for the enrolled and candidate mobile stations a network performance metric of communication indicating an aggregate quality of the network communication among the base station and multiple other enrolled mobile stations and the candidate station as if the candidate mobile station were enrolled, the aggregate quality being based at least in part on the information characterizing existing channels in use between the base station and the multiple other enrolled mobile stations; and (c) transmit from the candidate mobile station to the base station at least one of a determination that the aggregate quality is above a predetermined threshold or the aggregate quality itself to determine whether the candidate mobile station can join in the network using the new channel based on the network performance metric calculated at the candidate mobile station.

13. The communication system of claim 12:
wherein the candidate mobile station further executes the stored program to transmit the network performance metric to the base station, and
wherein the base station further executes the stored program to compare the network performance metric against similar network performance metrics transmitted from other candidate mobile stations.

14. The communication system of claim 13 wherein the network performance metric is compressed to allow multiple candidate receivers to transmit network performance metrics in a single time frame.

15. The communication system of claim 13 wherein the candidate mobile station further executes the stored program to transmit information characterizing the new channel to the base station when the candidate mobile station is enrolled.

16. The communication system of claim 12 wherein the candidate mobile station further executes the stored program to determine the network performance metric and transmit a self nomination to join the network only if the network performance metric is above a predetermined threshold.

17. The communication system of claim 16 wherein self nomination is a transmission of information characterizing the new channel.

18. The communication system of claim 12 wherein the information characterizing the channels is an attenuation and phase shift of a transmitted signal between the base station and the candidate mobile station.

19. The communication system of claim 12 wherein the base station provides multiple transmitting antennas and wherein the test signal is a signal from each of the antennas.

20. The communication system of claim 12 wherein the new channel is selected from the group consisting of a zero-forcing beam forming channel and a regularized zero-forcing beam forming channel.

21. The communication system of claim 12 wherein the calculation of the network performance metric assumes existing channels in use between the base station and enrolled mobile stations are unchanged.

22. The communication system of claim 12 wherein the base station is a multiple antenna system providing MIMO operation.

* * * * *